United States Patent [19]

Mishra

[11] 3,997,803
[45] Dec. 14, 1976

[54] ROTOR MEMBER FOR DYNAMOELECTRIC MACHINES WITH LONGITUDINAL PASSAGES OF DECREASING AREA COMMUNICATING WITH RADIAL CORE VENTS

[75] Inventor: Anil K. Mishra, Monroeville, Pa.

[73] Assignee: Westinghouse Electric Corporation, Pittsburgh, Pa.

[22] Filed: Aug. 1, 1974

[21] Appl. No.: 493,994

[52] U.S. Cl. .................... 310/59; 310/61
[51] Int. Cl.² ........................ H02K 9/00
[58] Field of Search ............ 310/52, 55, 53, 58, 310/59, 60, 61, 64, 65, 261, 264, 265; 417/420

[56] References Cited
UNITED STATES PATENTS

| 662,010 | 11/1900 | Mix | 310/65 |
|---|---|---|---|
| 934,369 | 9/1909 | Summers | 310/65 |
| 1,022,023 | 4/1912 | Foster | 310/61 |
| 2,381,297 | 8/1945 | Lynn | 310/65 |
| 3,225,231 | 12/1965 | Kudlacik | 310/64 |
| 3,260,874 | 7/1966 | Robinson | 310/64 |
| 3,322,985 | 5/1967 | Azubkin | 310/61 |
| 3,505,546 | 4/1970 | Victor | 310/55 |
| 3,831,050 | 8/1974 | Laskaris | 310/61 |

FOREIGN PATENTS OR APPLICATIONS

| 722,293 | 11/1965 | Canada | 310/61 |
|---|---|---|---|
| 893,628 | 4/1962 | United Kingdom | 310/261 |

Primary Examiner— R. Skudy
Attorney, Agent, or Firm—G. H. Telfer

[57] ABSTRACT

A rotor member is provided for dynamoelectric machines having a laminated core with radial ventilating ducts extending through the core and passages for ventilating air extending longitudinally of the core and communicating with the radial ducts. The longitudinal air passages decrease in cross-sectional area from one end of the core to the other in a manner to produce substantially equal velocity of air flow through all of the radial ducts to insure uniformity of temperature from one end of the rotor to the other.

9 Claims, 1 Drawing Figure

ROTOR MEMBER FOR DYNAMOELECTRIC MACHINES WITH LONGITUDINAL PASSAGES OF DECREASING AREA COMMUNICATING WITH RADIAL CORE VENTS

BACKGROUND OF THE INVENTION

The present invention relates to rotors for dynamoelectric machines, and more particularly to improved ventilation for rotors of the non-salient pole type.

Non-salient pole rotors have cylindrical rotor cores carrying windings disposed in longitudinal slots in the outer periphery of the core. The core is normally laminated and, in the usual construction, the core is made up of a series of packs of laminations with spacers between them to form radial ventilating ducts spaced apart longitudinally throughout the length of the core. Longitudinal passages are also usually provided communicating with the radial ducts, and ventilating air flows axially through the longitudinal passages and radially through the ducts to remove heat from the core. In one type of construction, the longitudinal passages are formed between radial arms on the shaft or on a spider member mounted on the shaft. An annular laminated core is supported on the ends of the radial arms which extend longitudinally for the length of the core, and the air passages thus extend under the core and communicate with the radial ducts of the core.

In the conventional design of such rotors, the longitudinal passages, which serve as headers for ventilating air, are of uniform dimensions from one end to the other, and air is forced through them either by an external fan or by a pumping action of the rotor itself so that the air flows longitudinally through the passages and radially through the ventilating ducts of the core. This type of construction has been widely used and in many cases gives satisfactory results. Careful study and analysis of the air flow in this type of rotor, however, has shown that substantial non-uniformities in air flow and in the temperature of the rotor may exist. Thus, in some designs with constant dimensions of the longitudinal air passages, as described above, the radial velocity of air flow through the ventilating ducts of the core may be as much as four times as great at one end of the core as at the other. This difference in air velocity results in a difference in temperature between the two ends of the core which is too great to be acceptable, in many cases, since such a severe temperature gradient across the laminated core may result in serious stress problems and other difficulties.

SUMMARY OF THE INVENTION

The present invention provides a rotor member of the general type discussed above in which substantially uniform velocity of air flow through the radial ventilating ducts is obtained. In accordance with the invention, the longitudinal air passages decrease in cross-sectional area from one end of the rotor to the other in such a manner that the velocity of air flow through the radial ducts is approximately the same in all parts of the rotor. The air passages are preferably formed between radial arms on the shaft with constant transverse spacing between the arms, and the bottom surface of each passage is uniformly tapered from one end of the rotor to the other to obtain the desired continuous uniform decrease in cross-sectional area. This results in the desired air flow pattern with substantially uniform radial velocity.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
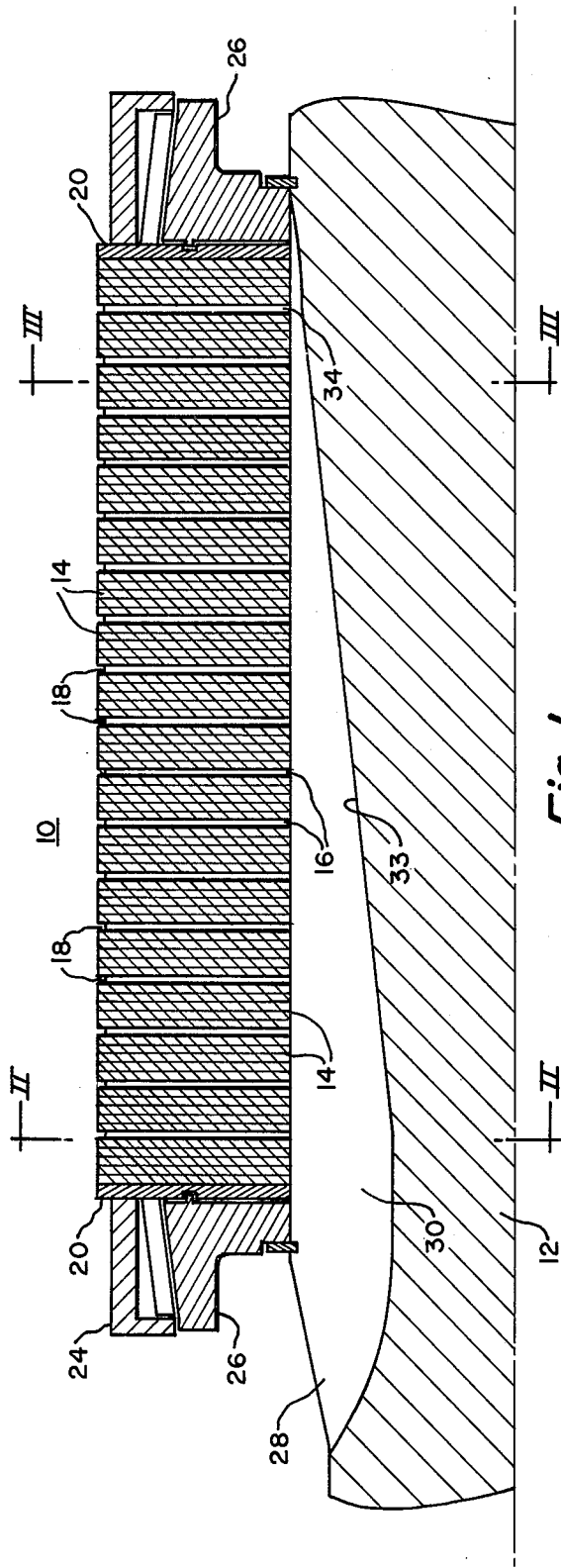
FIG. 1 is a longitudinal sectional view of a rotor member embodying the invention.

The drawings show a typical rotor embodying the invention. The particular rotor design shown in the drawing is intended for use in an alternating current generator with a conventional salient pole stator (not shown). It should be understood, however, that the ventilation system to be described herein is suitable for use in any type of rotor having a laminated core and distributed winding, such as an induction motor rotor or a direct current armature, for example.

As shown in the drawing, the rotor includes a laminated rotor core 10 and a shaft 12. The core 10 is of generally annular configuration, having inner and outer cylindrical surfaces, and is built up of packs 14 of laminations. The packs 14 are separated by spacer fingers 16 to form radial ducts 18 between adjacent packs of laminations. The spacers 16 may be sheet metal fingers of usual type attached to finger plates at the end of each lamination pack, or the packs may be spaced apart by any desired means. The radial ducts 18 thus formed are longitudinally spaced apart throughout the length of the core 10 and extend through the entire depth of the core to serve as ventilating ducts. The laminations of the core 10 are clamped together under substantial pressure in the usual manner between end plates 20 at each end. Slots 22 are provided in the outer cylindrical surface of the core and a rotor winding 24 of any suitable type is disposed in the slots. The end turns of the winding 24 extend beyond the core at each end and are supported in the usual manner on coil supports 26 attached to the end plates 20.

Figure 3:
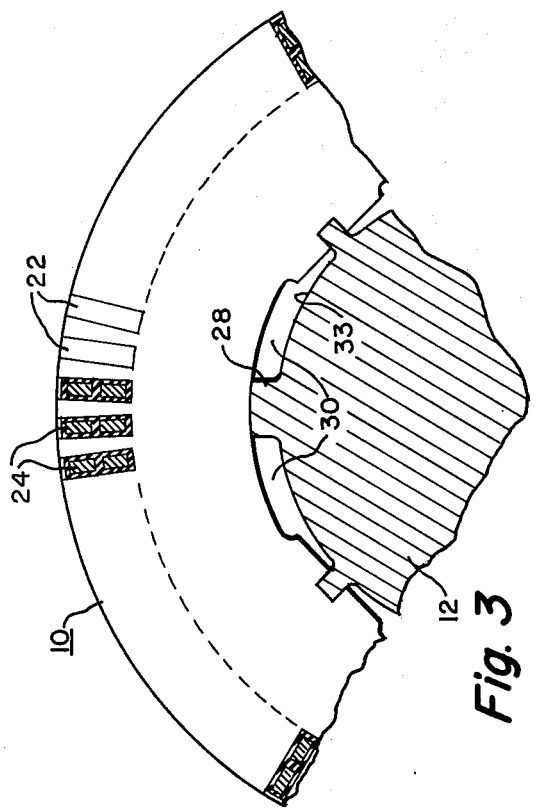
FIG. 3 is a partial transverse sectional view substantially on the line III—III of FIG. 1.
Figure 2:
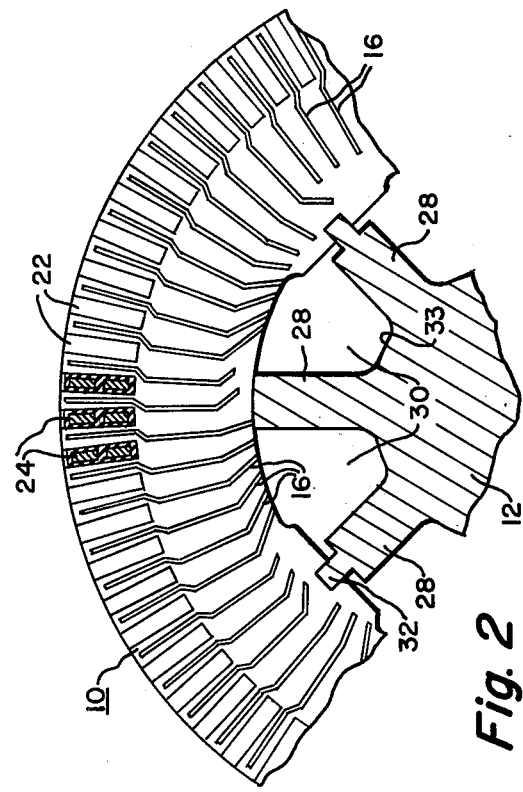
FIG. 2 is a partial transverse sectional view substantially on the line II—II of FIG. 1.

The core 10 is supported on the shaft 12 for rotation therewith. For this purpose, the shaft 12 is provided with radial extensions or arms 28 which may be integral with the shaft as shown, or which may be formed on a separate spider member pressed or otherwise secured on the shaft. The arms 28 extend longitudinally of the shaft for at least the length of the core 10 and are spaced apart circumferentially as shown in FIGS. 2 and 3 to form longitudinal passages 30 between them. The inner cylindrical surface of the annular core 10 engages the outer ends of the arms 28 to be supported thereby, and at least some of the arms 28 may be keyed to the core as indicated at 32 to provide a positive connection therewith.

It will be seen that the passages 30 between adjacent radial arms 28 provide longitudinal passages or headers for flow of ventilating air, and that this air will flow from the passages 30 into the radial ventilating ducts 18 and flow radially through these ducts to remove heat from the core 10 and the winding 24. Flow of air through the passages 30 may be induced by the pumping or blower action of the rotor itself or, if desired, a separate fan or blower of any suitable type may be mounted on the shaft 12 adjacent the end of the core.

As explained above, this type of ventilation is effective in many cases but in conventional designs in which the air passages 30 are of the same dimensions throughout their length, careful analysis of the air flow has shown that the air velocity in the radial ducts 18 varies greatly from one end of the core to the other, and the velocity of the air in the last duct at the discharge end of the core may be as much as four times the radial velocity in the radial ducts near the entrance end. This, of course, results in a wide variation in the temperature of the core which can cause serious stress problems in heavily loaded machines, as well as various operating difficulties due to unequal stress distribution and unequal expansion of the core and winding conductors.

In accordance with the present invention, these difficulties are avoided by designing the passages 30 in a manner which results in substantially equal radial velocity of the air flow in the ducts 18 throughout the length of the core 10. For this purpose, the passages 30 are designed so that the cross-sectional area of each passage decreases from one end of the rotor core to the other. This may be accomplished in any desirred manner which will reduce the area from one end to the other, as by stepping the shaft diameter at the base of the arms 28, or by varying the transverse width of the arms, for example. In the preferred embodiment shown in the drawing, however, the decrease in area of the passages is continuous and uniform and is produced by tapering the bottom surface 33 of each passage. Thus, as can be seen in FIGS. 2 and 3, the radial arms 28 are of the same width throughout and the transverse spacing between the arms remains constant from one end of the core to the other. The bottom surface 33 of each passage, however, is uniformly and linearly tapered, as can be seen in FIG. 1, so that the cross-sectional area of the passage decreases uniformly and continuously from one end to the other. The optimum taper of the surfaces 33 can be determined by analysis or by tests. It has been found that a reasonable approximation to the ideal can be obtained by making the smallest area of each passage 30, adjacent the last radial vent 34 at the discharge end, approximately equal to the area of the vent 34 which communicates with the passage, that is, the area of the vent 34 between the arms 28. The bottom surface 32 is then tapered linearly to the maximum opening at the other end so that uniform and continuous variation in the cross-sectional area from one end of the core to the other is obtained. Tests have shown that with a design of this type, the radial velocity of air flow through all of the radial ducts 18 is substantially the same, and uniform cooling and uniform temperature distribution throughout the length of the rotor are thus obtained.

It should now be apparent that a rotor construction has been provided in which the difficulties due to non-uniform radial air flow velocity, and the resulting non-uniform temperature, are eliminated so that the stress problems previously encountered are avoided. A particular construction has been shown and described for the purpose of illustration, but it will be understood that the invention is applicable to any type of rotor utilizing a laminated core with radial ventilating ducts and longitudinal air passages.

What is claimed is:

1. A rotor member for a dynamoelectric machine including a generally cylindrical laminated rotor core carrying a winding thereon, said core having longitudinally spaced ventilating ducts extending radially therethrough, and said rotor member having passages for ventilating air extending longitudinally therethrough and communicating with said radial ventilating ducts, a shaft supporting said rotor core, and said longitudinal passages extending between the shaft and the rotor core, the cross-sectional area of said longitudinal passages decreasing from one end to the other.

2. A rotor member as defined in claim 1 in which said shaft has longitudinal passages formed in its surface, said passages tapering in depth from one end of the rotor core to the other.

3. A rotor member as defined in claim 2 in which said passages have a constant transverse width and decrease uniformly in radial depth from one end of the core to the other.

4. A rotor member for a dynamoelectric machine comprising a shaft and an annular laminated rotor core carrying a winding within coil slots extending longitudinally through the radially outer portion of said core, said shaft including a portion having radial arms extending longitudinally thereof, said core having a plurality of longitudinally spaced ventilating ducts extending radially therethrough, said radial arms engaging the inner surface of the rotor core and forming passages between them for ventilating air, said passages extending longitudinally throughout the length of the core and communicating with said radial ventilating ducts, and the cross-sectional area of said passages decreasing from one end of the core to the other.

5. A rotor member as defined in claim 4 in which the cross-sectional area of said passages decreases continuously and uniformly from one end of the core to the other.

6. A rotor member as defined in claim 4 in which the smallest area of each passage adjacent the last of said radial ventilating ducts at said other end of the core is approximately equal to the area of said duct communicating with each passage.

7. A rotor member as defined in claim 4 in which the radial depth of said passages decreases from one end of the core to the other.

8. A rotor member as defined in claim 4 in which the transverse space between adjacent radial arms is constant from one end of the core to the other, and the bottom surface of each of said passages tapers uniformly from one end of the core to the other.

9. A rotor member as defined in claim 8 in which the smallest cross-sectional area of each passage adjacent the last of said radial ventilating ducts at said other end of the core is approximately equal to the area of said duct communicating with each passage.

* * * * *